United States Patent
Lee et al.

(10) Patent No.: US 6,909,534 B2
(45) Date of Patent: Jun. 21, 2005

(54) WIDEBAND FOUR-WAVE-MIXING WAVELENGTH CONVERTER

(75) Inventors: San-Liang Lee, Taipei (TW); Dar-Zu Hsu, Tainan (TW); Pei-Miin Gong, Jhonghe (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/773,180

(22) Filed: Feb. 9, 2004

(65) Prior Publication Data

US 2005/0063040 A1 Mar. 24, 2005

(30) Foreign Application Priority Data

Sep. 18, 2003 (TW) ........................................ 92125817 A

(51) Int. Cl.⁷ .............................................. G02F 1/39
(52) U.S. Cl. ...................................... 359/330; 359/326
(58) Field of Search ............................... 359/326–332; 372/21, 22

(56) References Cited

U.S. PATENT DOCUMENTS

| | | | | |
|---|---|---|---|---|
| 6,665,113 B2 | * | 12/2003 | Aso et al. | 359/326 |
| 2001/0007509 A1 | * | 7/2001 | Aso et al. | 359/326 |
| 2002/0063944 A1 | * | 5/2002 | Kim et al. | 359/326 |
| 2002/0163689 A1 | | 11/2002 | Matsushita et al. | 385/24 |
| 2004/0184807 A1 | * | 9/2004 | Aso et al. | 398/85 |

OTHER PUBLICATIONS

Dar–Zu Hsu et. al., *High–efficiency and wideband SOA–based wavelength converters by using four–wave–mixing with orthogonal pumps and an assisted beam*, Dec. 2003, Taiwan.
I. Tomkos et. al., *Performance of a Reconfigurable Wavelength Converter Based on Dual–Pump–Wave Mixing in a Semiconductor Optical Amplifier*, IEEE Photonics Technology Letters, vol. 10, No. 10, pp. 1404–1406, Oct. 1998.
A. D'Ottavi et. al., *Wavelength Conversion at 10 Gb/s by Four–Wave Mixing Over a 30–nm Interval*, IEEE Photonics Technology Letters, vol. 10, No. 7, pp. 952–954, Jul. 1998.
Trefor J. Morgan et. al., *All–Optical Wavelength Translation Over 80 nm at 2.5 Gb/s Using Four–Wave Mixing in a Semiconductor Optical Amplifier*, IEEE Photonics Technology Letters, vol. 11, No. 8, pp. 982–984, Aug. 1999.

* cited by examiner

Primary Examiner—John D. Lee
(74) Attorney, Agent, or Firm—Bacon & Thomas PLLC

(57) ABSTRACT

The present invention provides a wavelength converter with wideband four-wave-mixing, which includes a laser diode, an optical modulator, a first and a second polarization controllers, a first, a second and a third tunable lasers, an optical coupler, a semiconductor optical amplifier (SOA) and a multiplexer. The present invention utilizes an assist beam that can improve the recovery rate and saturation power of the SOA. While the SOA is operated at a bias current close to the transparent condition for the assist beam, it does not influence the gain of the SOA wavelength converter.

18 Claims, 7 Drawing Sheets

WIDEBAND FOUR-WAVE-MIXING WAVELENGTH CONVERTER

BACKGROUND OF THE INVENTION

1. Field of the Invention

The present invention relates to the technical field of wavelength converter and, more particularly, to a wideband wavelength converter based on four-wave-mixing.

2. Description of Related Art

In the development of optical fiber network, time-division multiplexing (TDM) technology is the most popular study issue as the TDM technology is the basic technique used in the circuit-switching of conventional telecommunication. Such a TDM fiber network essentially has two specifications, one of synchronous optical network (SONET) in USA and the other of synchronous digital hierarchy (SDH) in Europe and Japan. Recently, wavelength division multiplexing (WDM) has been applied in optical fiber networks, which can concurrently transmit data of multiple channels (wavelengths) in an optical fiber in a unit of wavelength, thus greatly increasing the bandwidth capability.

In a WDM transmission, a wavelength converter is applied to convert a signal beam into a transmission beam with a certain wavelength for transmission. In optical fiber networks, the WDM wavelength converter needs to meet with high conversion efficiency and wideband wavelength conversion range. At this point, the conversion efficiency indicates that post-converted signal power is divided by ante-converted signal power. Semiconductor optical amplifiers (SOAs) can be applied to configure wavelength converter based on four-wave mixing. When the wavelength converter is converting wavelengths, signal beam and pump beam are injected into an SOA for four-wave mixing, thereby generating a converted signal with the same content as the signal beam. The power ratio of the converted signal over the input signal power is referred to as the conversion efficiency. The conversion efficiency is increased with increasing saturation power and gain of the SOA. However, the conversion efficiency decreases rapidly when wavelength difference of the input signal beam and the converted signal beam is increased.

To overcome the aforementioned problem, in IEEE Photon. Technol. Lett., vol. 10, pp. 952–954, July 1998, a long semiconductor optical amplifier (SOA) is proposed. Since using the longer SOA can provide more optical carriers, the conversion efficiency and the signal to background ratio (SBR) are enhanced. However, a drawback of using the longer SOA is that the induced amplified spontaneous emission (ASE) noise is also enlarged. Besides, using the longer SOA costs higher and the conversion efficiency will degrade rapidly as the detuning range is increasing.

In IEEE Photon. Technol. Lett., vol. 10, pp. 1404–1406, October 1998, a method of using two parallel polarization pumps is proposed, wherein the wavelength difference between the two parallel polarization pumps is fixed. No matter how the gratings are created, the contribution will fall in the same converted wavelength. Thus, the converted signal can be polarized insensitive to the input signal. However, because such a configuration needs two parallel pumps, the conversion efficiency will degrade rapidly as the detuning range is increasing.

In IEEE Photon. Techno. Lett., vol. 11, pp. 982–984, August 1999, there is proposed an "All-optical wavelength translation over 80 nm at 2.5 Gb/s using four-wave mixing in a semiconductor optical amplifier". In the proposed architecture, two orthogonal-polarization pumps are used to achieve that an 80-nm wavelength conversion range. However, such a semiconductor optical amplifier needs a larger bias current (about 200 mA) that causes a thermal effect, reduces the lifetime of the semiconductor optical amplifier and increases ASE noise. Besides, the conversion efficiency is only about −15 dB and the SBR is only about 22 dB, which are not acceptable. Therefore, it is desirable to provide an improved wavelength conversion to mitigate and/or obviate the aforementioned problems.

SUMMARY OF THE INVENTION

The object of the present invention is to provide a wavelength converter with wideband four-wave mixing, which can avoid low efficiency in the prior art and reduced lifetime of a semiconductor optical amplifier (SOA) caused by the larger bias current used in the prior art.

To achieve the object, a wavelength converter with wideband four-wave mixing is provided. The wavelength converter includes a laser diode, an optical modulator, a first polarization controller, a first tunable laser, a second tunable laser, a second polarization controller, an optical coupler, a semiconductor optical amplifier (SOA), a third tunable laser and a multiplexer. The laser diode is an optical carrier to load an input electrical signal. The optical modulator has a first input terminal connected by an optical fiber to the first polarization controller and a second input terminal receiving the input electrical signal, thus modulating the input electrical signal to the laser diode and accordingly generating an input optical signal. The first polarization controller is connected by an optical fiber to a terminal of the optical modulator, thus controlling polarization of the input signal. The first tunable laser generates a first pump with a first wavelength. The second tunable laser generates a second pump with a second wavelength. The second polarization controller is connected by an optical fiber to the second tunable laser, thus controlling polarization of the second pump. The optical coupler couples the input signal, the first pump and the second pump in an optical fiber. The semiconductor optical amplifier (SOA) is connected by an optical fiber to the optical coupler in order to generate a converted signal with four-wave mixing (FWM) using its third-order nonlinear property. The third tunable laser generates an assist beam with a third wavelength. The multiplexer has a first output terminal connected by an optical fiber to an output of the SOA and a input terminal connected by an optical fiber to the third tunable laser, thus allow the injection of the assist beam and output of the converted signal, and a second output terminal connected to an output fiber.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
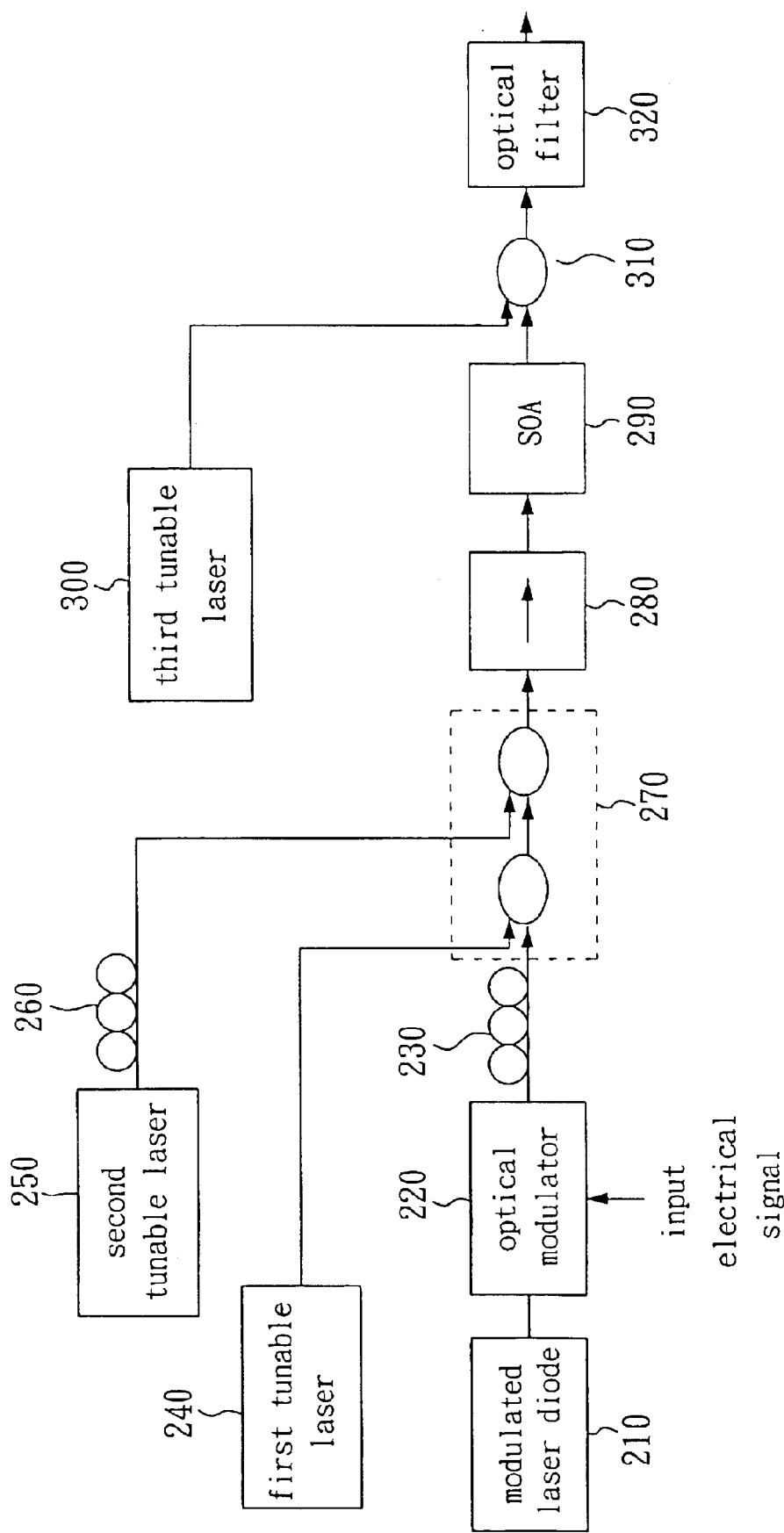
FIG. 1 is a block diagram of a wideband SOA-based wavelength converter using four-wave-mixing (FWM) in accordance with the invention.

With reference to FIG. 1, there is shown a block diagram of a semiconductor-optical-amplifier-based (SOA-based) wavelength converter with wideband four-wave-mixing (FWM) in accordance with the invention. In FIG. 1, the wavelength converter includes a laser diode 210, an optical modulator 220, a first polarization controller 230, a first tunable laser 240, a second tunable laser 250, a second polarization controller 260, an optical coupler 270, an optical isolator 280, a semiconductor optical amplifier (SOA) 290, a third tunable laser 300, a multiplexer 310 and an optical filter 320. As shown in FIG. 1, the laser diode 210 is preferably a distributed feedback laser diode (DFB-LD) to generate a laser beam with both narrow line width and very small sidelobes as an optical carrier to load an input electrical signal.

The optical modulator 220 has a first input terminal connected to the laser diode 210 via an optical fiber and a second input terminal receiving the input electrical signal, thus modulating the input electrical signal to an optical beam of the laser diode and accordingly generating an input optical signal. The optical modulator 220 can be an externally optical modulator or a directly optical modulator. Generally, signal generated by the externally optical modulator has better property. However, since a four-wave mixing converter has complete transparency to modulation format, a typical optical modulator can be used as the optical modulator 220.

The first polarization controller 230 is connected to a terminal of the optical modulator 220 via an optical fiber, thus controlling polarization of the input optical signal. The first tunable laser 240 generates a first pump with a first wavelength, thus determine the required conversion wavelength spacing for high conversion efficiency. The second tunable laser 250 generates a second pump with a second wavelength, thus determine the required wavelength for the converted signal. The first polarization controller 230 controls polarization of the input optical signal parallel with polarization of the first pump, thus achieving the maximum conversion efficiency. The first tunable laser 240 tunes the first wavelength of the first pump, such that a wavelength difference of the laser diode and the first pump is a moderately small value (e.g., smaller than 2 nm).

The second polarization controller 260 is connected to the second tunable laser 250 via an optical fiber, thus controlling polarization of the second pump. The second polarization controller controls the polarization of the second pump, such that the second pump does not affect the converted signal power because the polarization of the second pump is orthogonal to that of the first pump.

The optical coupler 270 couples the input optical signal, the first pump and the second pump in an optical fiber in order to inject them into the semiconductor optical amplifier (SOA) 290 for the optimal conversion effect.

The optical isolator 280 is connected to an output of the optical coupler 270 via an optical fiber. Since any optical element will reflect some transmitting rays back to cause an attack, the optical isolator 280 is implemented after the optical coupler 270, thus controlling transmitting beam in a single direction. Accordingly, optical elements, e.g., the first tunable laser 240 and the second tunable laser 250, can avoid damages from reflective rays.

The third tunable laser 300 generates an assist beam with a third wavelength, wherein the third wavelength is 14xx nm (1400–1480 nm). Preferably, the assist beam is contradirectionally injected into the SOA 290, but forward injection can be also acceptable. The FWM conversion efficiency of the SOA 290 increases approximately with $Go^3[Ps]^2$, where Go is the unsaturated gain and Ps is the saturation power of the SOA 290. The saturation power is inversely proportional to the carrier lifetime of the SOA 290. Therefore, speeding up the carrier recovery rate of the SOA 290 can enhance the FWM conversion efficiency. The carrier recovery rate can be enhanced by injecting the assist beam into the SOA 290, thereby increasing the FWM conversion efficiency of the SOA 290.

The semiconductor optical amplifier (SOA) 290 is connected to the output of the optical isolator 280 via an optical fiber, thus generating a converted signal with four-wave mixing (FWM) by means of third-order nonlinear property of the SOA 290. The four-wave indicates the assist beam, the input optical signal, the first pump and the second pump. The converted signal has a frequency ) $\omega_c = \omega_2 \pm |\omega_s - \omega_1|$ and an optical field amplitude as follows:

$$E_c = E_2(E_1 \cdot E_s)\gamma(\omega_s - \omega_1)\exp[i(\omega_c t + \Delta\Phi)] + E_s(E_1 \cdot E_2)\gamma(\omega_2 - \omega_1)\exp[i(\omega_c t + \Delta\Phi)] \quad (1)$$

where $\omega 1$, $\omega 2$, $\omega s$, $\omega c$, E1, E2, Es and Ec are frequencies and field amplitudes of the first pump, the second pump, the input optical signal and the converted signal, respectively, and phase difference $\Delta\Phi = \Phi s - \Phi 1 + \Phi 2$ for $\Phi s$, $\Phi 1$ and $\Phi 2$ respectively represent phases of the input optical signal, the first pump and the second pump. Besides, $\gamma(\omega_s - \omega 1)$ is a complex coupling coefficient.

Generally, the SOA 290 is used as an optical amplifier. However, since the third-order nonlinear property is significant, the SOA 290 in this embodiment is applied as a nonlinear medium to generate a converted signal with four-wave mixing using the nonlinear property, but other suitable nonlinear elements can also be used to generate the converted signal. The SOA 290 is applied because of the strongest nonlinearity and the most significant assistance for the carrier recovery rate.

Since the third-order nonlinear property of the SOA 290 is significant, the optical field amplitude converted is a function of optical field amplitudes of the assist beam, the input optical signal, the first pump and the second pump when the SOA 290 undergoes the four-wave mixing (FWM). Correlation items after conversion are eliminated by the optical filter 320 and thus are not written in equation (1). In the second item $E_s(E_1 \cdot E_2)\gamma(\omega_2 - \omega_1)\exp[i(\omega_c t + \Delta\Phi)]$ of equation (1), $(E_1 \cdot E_2)$ is equal to zero because the two pumps are polarized in orthogonal to each other, such that the second item becomes zero and only the first item $E_2(E_1 \cdot E_s)\gamma(\omega_s - \omega_1)\exp[i(\omega_c t + \Delta\Phi)]$ remains in equation (1). Further, $(E_1 \cdot E_s)$ is the maximum because the input optical signal and the first pump are polarized in parallel to each other, thus signal power after wavelength conversion is the strongest.

The multiplexer 310 has a first input terminal connected by an optical fiber to an output of the SOA 290 and a second input terminal connected by an optical fiber to the third tunable laser 300, so as to inject the assist beam and output the converted signal into an output fiber. Since the wavelength is ranged in the regime of 14xx nm for the assist beam and in 15xx nm for the input optical signal, a multiplexer with bandwidth tolerance of 14xx nm and 15xx nm is applied. As known, the current optical communication employs the following bands: S-band (1485~1525 nm), C-band (1525~1565 nm) and L-band (1565 nm~). Therefore, the assist beam does not affect transmitting signals originated from the optical communication as it has a wavelength in a short wavelength range smaller than 1485 nm.

Figure 2:
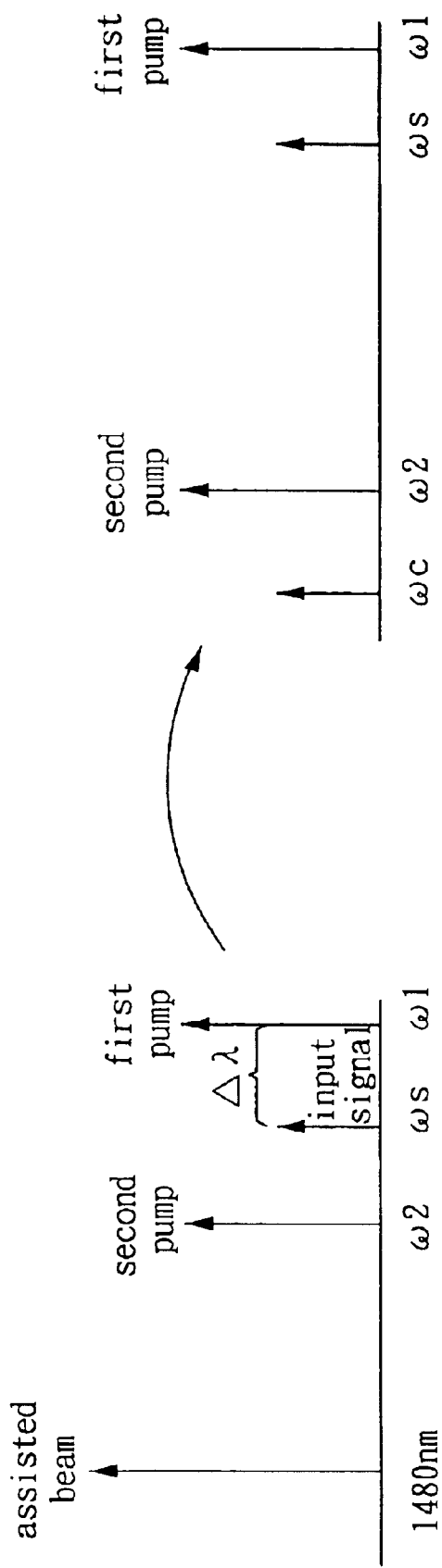
FIG. 2 is a schematic graph of frequencies of an assist beam, a first pump, a second pump, an input optical signal and a converted signal in accordance with the invention.

The optical filter 320 filters the converted signal. FIG. 2 is a schematic graph of frequencies of the assist beam, the first pump, the second pump, the input optical signal and the converted signal. As shown in FIG. 2, since only the converted signal is required, the optical filter 320 can be a tunable filter, e.g., Fabry-Perot tunable filter, for allowing the converted signal with frequency $\omega_c$ to pass through. Frequency $\omega_2$ can vary with the conversion frequency $\omega_c$ as $\omega_c = \omega_2 \pm |\omega_s - \omega_1|$, where $(\omega_s - \omega_1)$ is constant. Thus, the optimal conversion efficiency (CE) is obtained in wide conversion band.

Figure 4:
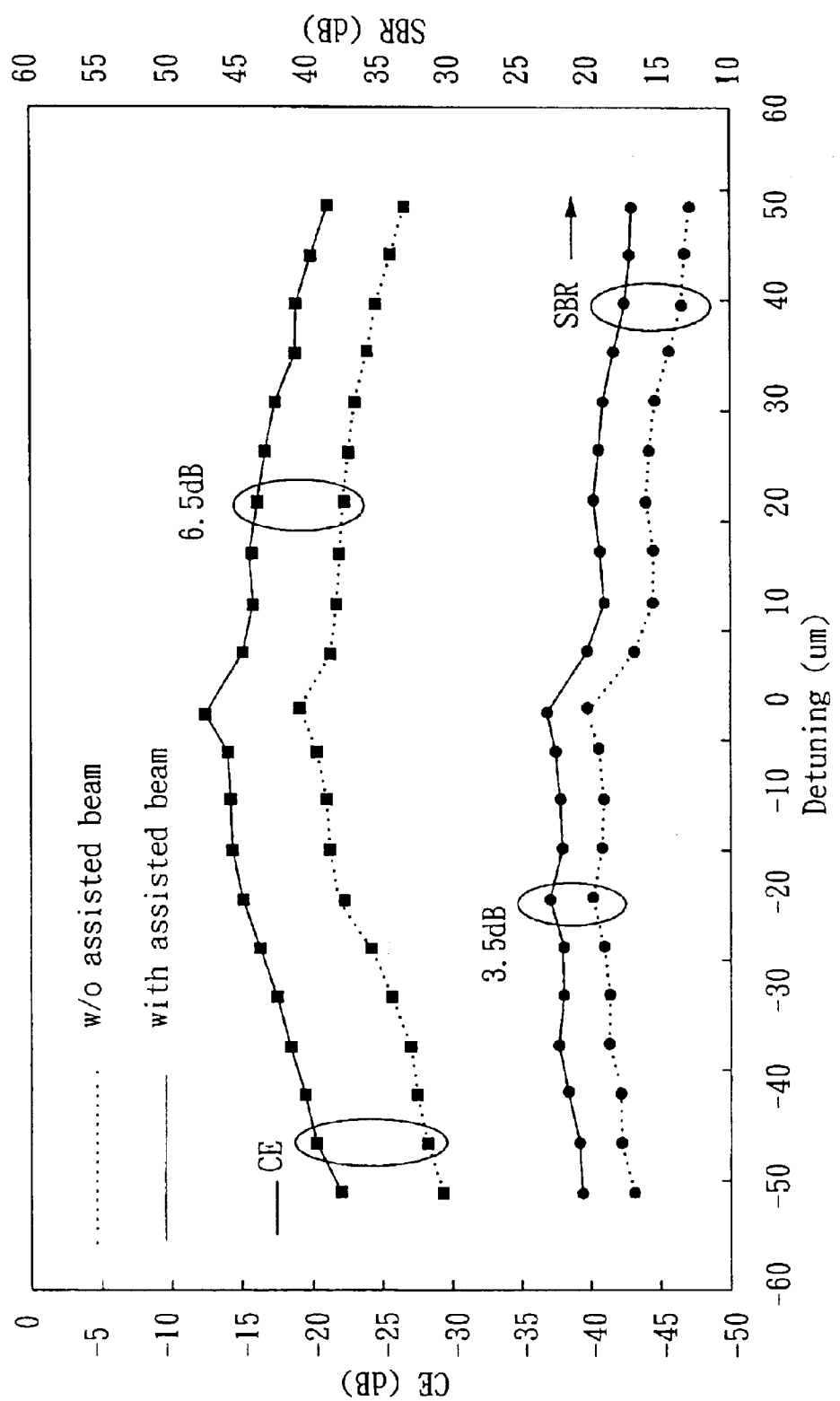
FIG. 4 shows a comparison graph of conversion efficiency (CE) and signal to background ratio (SBR) of a semiconductor optical amplifier in accordance with the invention.
Figure 5:
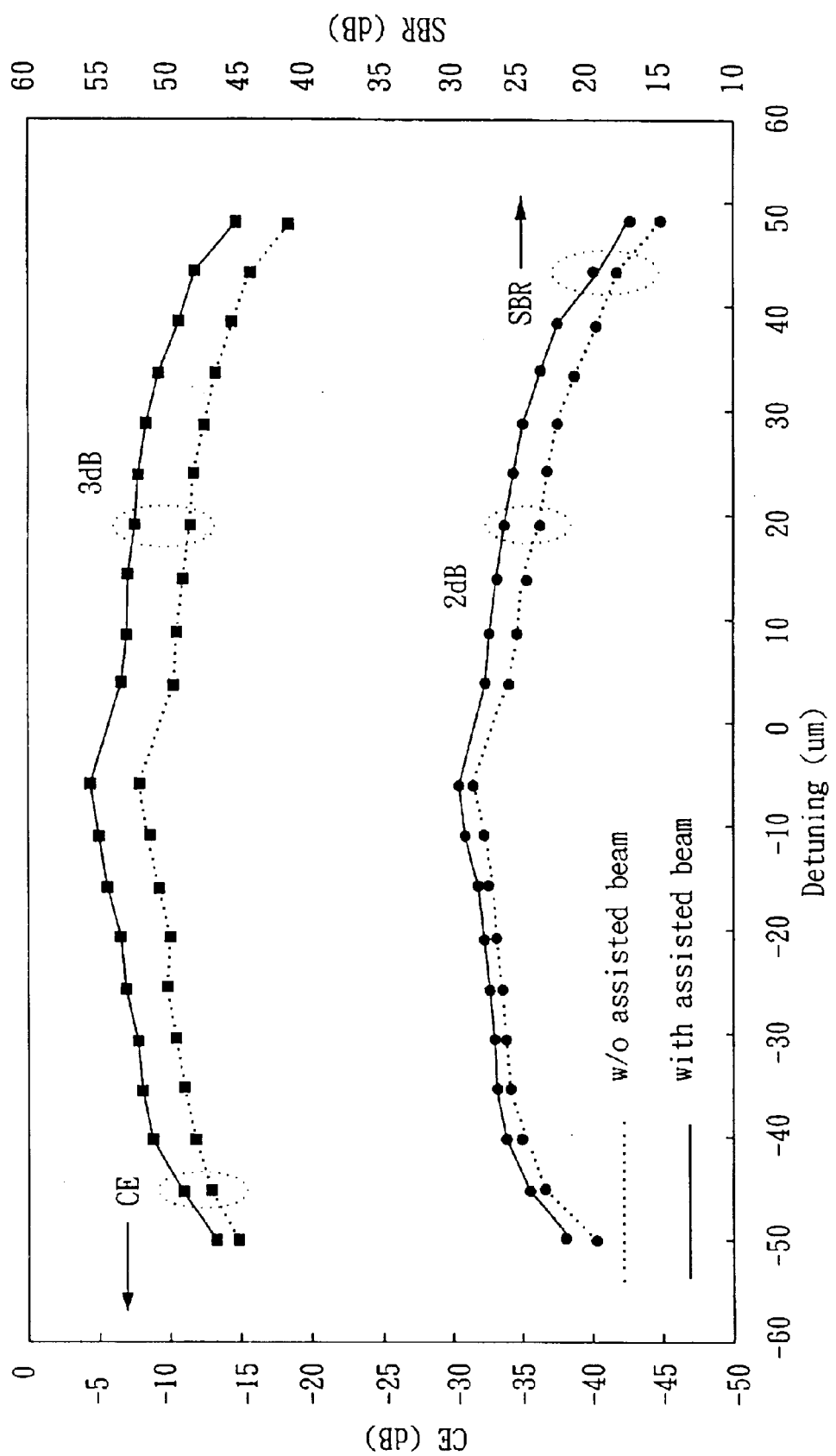
FIG. 5 shows a comparison graph of the semiconductor optical amplifier biased at 200 mA in accordance with the invention.

FIG. 4 is a graph of conversion efficiency (CE) and signal to background ratio (SBR) of the semiconductor optical amplifier (SOA) 290 with/without an assist beam. A bias current of the SOA 290 is transparent to the assist beam. Namely, when the assist beam is added, the saturation power of the SOA is increased without affecting the gain. As shown in FIG. 4, the CE and the SBR are respectively 6.5 dB and 3.5 dB higher with the assist beam than one without it. FIG. 5 is a graph of conversion efficiency (CE) and signal to background ratio (SBR) of the semiconductor optical amplifier (SOA) 290 with a high bias current close to the threshold. As shown in FIG. 5, with an assist beam, the CE can reach to −5 dB and the SBR can reach to 30 dB.

Figure 6:
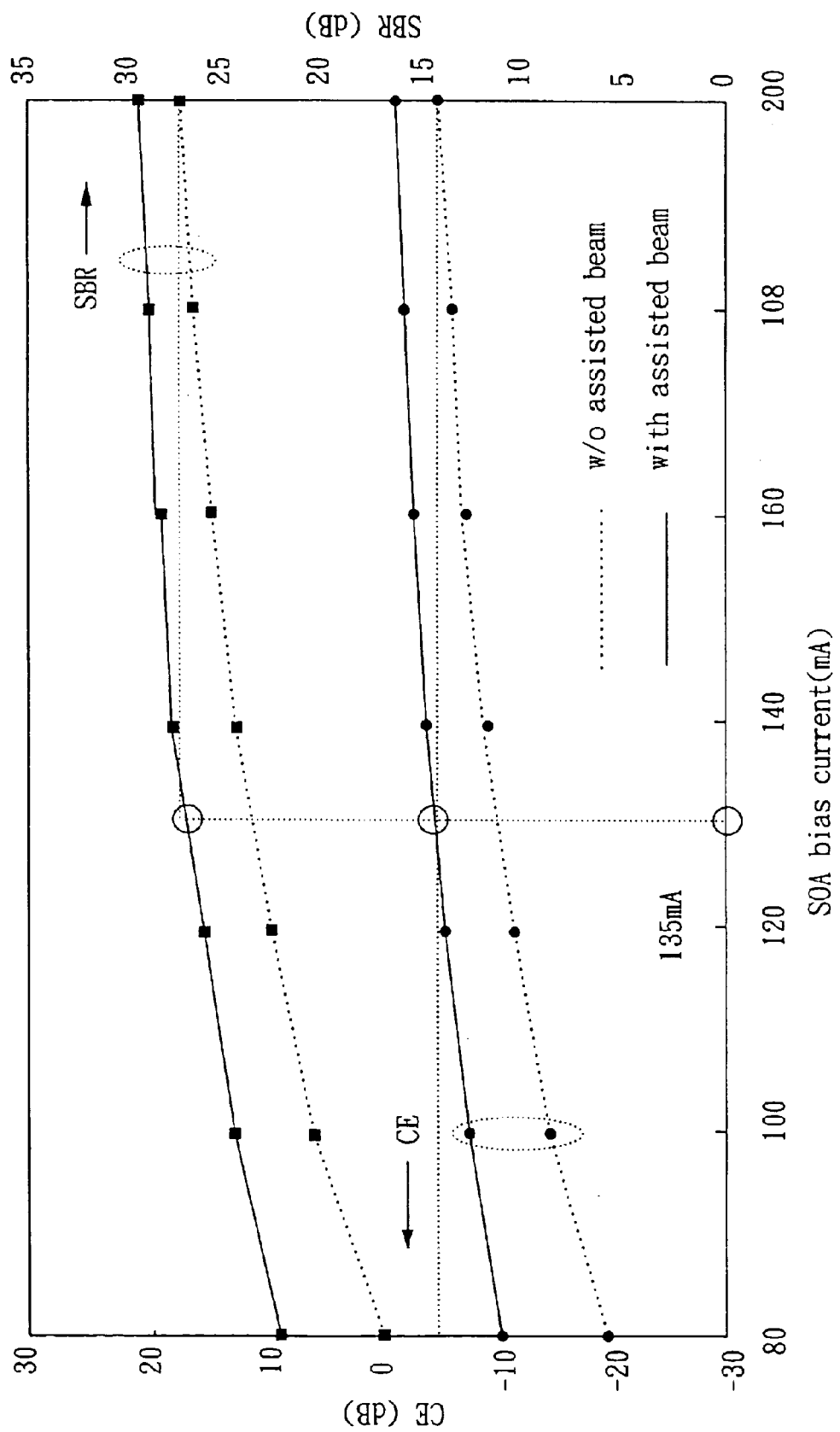
FIG. 6 is a relation graph of bias current and conversion efficiency of the semiconductor optical amplifier in accordance with the invention.

FIG. 6 shows a relation graph of CE and SBR of the SOA 290. As shown in FIG. 6, the CE and the SBR at different bias currents are higher with the assist beam than one without it.

Figure 7:
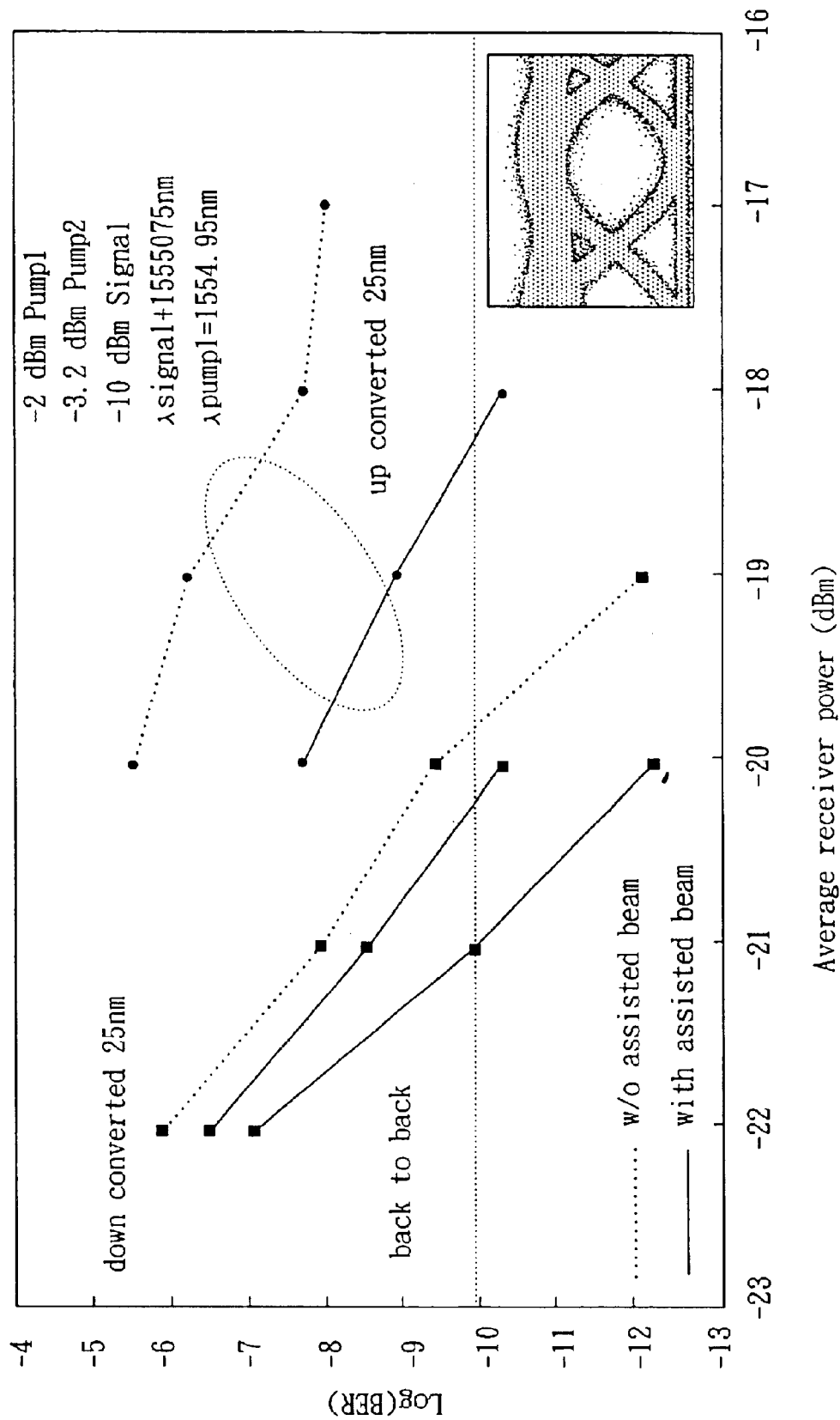
FIG. 7 is a comparison graph of bit error rate (BER) according to the invention.

FIG. 7 shows a comparison graph of bit-error rate (BER) for up-conversion and down-conversion. When the SOA 290 has a high bias current close to the threshold, the input optical signal Ps is converted upwardly and downwardly to a wide range, e.g., 25 nm. As shown in FIG. 8, it shows that for the same BER, using the assist beam requires much less power than one without it. Namely, due to the assist beam, better BER can be obtained at the same power. Besides, the signal quality degrades considerably for up-conversion and for example, at 25 nm, a BER about $10^{-10}$ cannot be reached without using an assist beam.

In view of the foregoing, it is known that the invention uses an assist beam to increase the recovery rate and further the saturation power. In addition, when the SOA is operated at a bias current transparent to the assist beam, the assist beam will not affect the gain of the SOA. Therefore, the invention uses the assist beam to improve a converted signal's power, i.e., improve the conversion efficiency (CE) and signal to background ratio (SBR) for wavelength converters.

Figure 3:
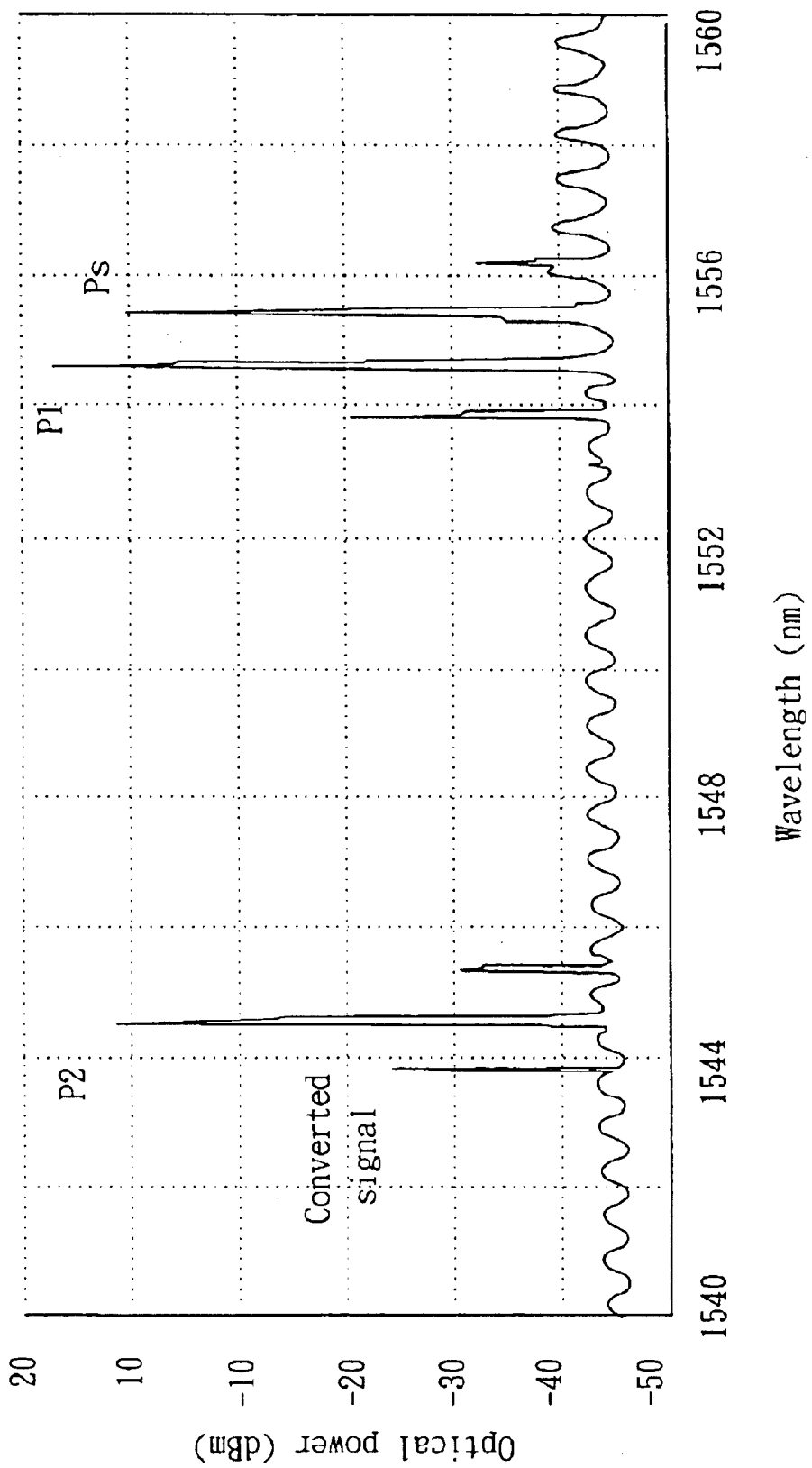
FIG. 3 shows a power-spectrum graph of the first pump, the second pump, the input optical signal and the converted signal in accordance with the invention.

In the experiment, the application of devices and associated parameters are described below. The wavelength of the modulated laser diode 210 is 1555.75 nm. The optical modulator 220 is a LiNbO$_3$ optical modulator. The optical coupler 270 consists of two 2×1 optical couplers or one 3×1 optical coupler. The cited values are applied to FIG. 3 to carry out this embodiment, namely, a power-spectrum graph of the first pump P1, the second pump P2, the input optical signal Ps and the converted signal. In the power-spectrum graph of FIG. 3, the P1's wavelength is 1554.94 nm (covered in 1555.75 nm–0.8 nm), and the converted signal's wavelength is a wavelength of the P2's wavelength minus 0.8 nm. The assist beam's wavelength is 1480 nm and accordingly for the SOA, a transparent current 100 mA is measured.

Although the present invention has been explained in relation to its preferred embodiment, it is to be understood that many other possible modifications and variations can be made without departing from the spirit and scope of the invention as hereinafter claimed.

What is claimed is:

1. A wavelength converter with wideband four-wave-mixing, comprising:
   a laser diode for using as an optical carrier to carry an input electrical signal;
   an optical modulator, having a first input terminal connected by an optical fiber to the modulated laser diode and a second input terminal receiving the input electrical signal, thus modulating the input electrical signal to a optical beam of the modulated laser diode and accordingly generating an optical signal;
   a first polarization controller, connected by an optical fiber to a terminal of the optical modulator, thus controlling polarization of the input optical signal;
   a first tunable laser, generating a first pump with a first wavelength, thus determining required conversion range;
   a second tunable laser, generating a second pump with a second wavelength, thus determining the required conversion wavelength;
   a second polarization controller, connected by an optical fiber to the second tunable laser, thus controlling the polarization of the second pump;
   an optical coupler, coupling the input optical signal, the first pump and the second pump into an optical fiber;
   a semiconductor optical amplifier (SOA), connected by an optical fiber to the optical coupler, thus generating a converted signal with four-wave mixing (FWM) using its third-order nonlinear property;
   a third tunable laser, generating an assist beam with a third wavelength; and
   a multiplexer, having a first input terminal connected by an optical fiber to an output of the SOA and a second input terminal connected by an optical fiber to the third tunable laser, thus injecting the assist beam and output the converted signal into an output fiber.

2. The converter as claimed in claim 1, further comprising an optical isolator, coupled between the optical coupler and the SOA, thus limiting transmitting beam in a single direction.

3. The converter as claimed in claim 1, further comprising an optical filter for filtering the converted signal.

4. The converter as claimed in claim 1, wherein the laser diode is a distributed feedback laser diode (DFB-LD).

5. The converter as claimed in claim 1, wherein the optical modulator is a LiNbO3 optical modulator.

6. The converter as claimed in claim 1, wherein the first polarization controller controls the polarization of the input optical signal in parallel to the polarization of the first pump.

7. The converter as claimed in claim 1, wherein the second polarization controller controls the polarization of the second pump orthogonal to the polarization of the first pump.

8. The converter as claimed in claim 1, wherein a wavelength of the laser diode is a wavelength in the SOA's bandwidth.

9. The converter as claimed in claim 1, wherein a wavelength of the assist beam is a wavelength out of the SOA's bandwidth.

10. The converter as claimed in claim 9, wherein the wavelength is a short wavelength.

11. The converter as claimed in claim 1, wherein the multiplexer is a wideband multiplexer capable of passing through 14xx nm and 15xx nm beams.

12. The converter as claimed in claim 1, wherein a wavelength difference between the laser diode and the first pump is a value smaller than 2 nm.

13. The converter as claimed in claim 1, wherein the second pump's wavelength generated by the second tunable laser is adjusted to a predetermined wavelength.

14. The converter as claimed in claim 1, wherein the optical coupler injects the input optical signal, the first pump and the second pump into the SOA.

15. The converter as claimed in claim 1, wherein the third tunable laser generates an assist beam which is combined with the input optical signal, the first pump and the second pump for injection into the SOA.

16. The converter as claimed in claim 15, wherein the assist beam is a short-wavelength beam.

17. The converter as claimed in claim 15, wherein the assist beam is injected into the SOA inversely.

18. The converter as claimed in claim 1, wherein the converted signal generated by the SOA is filtered by a tunable optical filter.

* * * * *